Aug. 2, 1966     E. W. VAN WINKLE     3,264,460

FUNCTION COMPUTER EMPLOYING CURVE FITTING TECHNIQUES

Filed Sept. 7, 1961

INVENTOR.
EDGAR W. VAN WINKLE
BY
ATTORNEY

United States Patent Office 3,264,460
Patented August 2, 1966

3,264,460
FUNCTION COMPUTER EMPLOYING CURVE FITTING TECHNIQUES
Edgar W. Van Winkle, Rutherford, N.J., assignor to The Bendix Corporation, Teterboro, N.J., a corporation of Delaware
Filed Sept. 7, 1961, Ser. No. 136,498
5 Claims. (Cl. 235—197)

The invention relates in general to analog computers and more particularly to an analog computer for computing square root, logarithm, and other functions of a variable by curve fitting techniques.

Heretofore, an analog method of calculating a function of a variable, such as the square root of temperature for use in an air data computer, required the use of an electrical bridge having a temperature resistance probe in one leg and a non-linear potentiometer in another leg. The output of the bridge was connected to a servoamplifier for controlling a servomotor drivably connected to the potentiometer to rebalance the bridge. With this arrangement, the square root of temperatures could be measured as displacement on the servomotor shaft in the range from −70° C. to +160° C. with an accuracy of only 1.0 percent. The system was relatively complex and required repair and overhaul after 5000 hours of operation. The present invention is accurate in this temperature range to 0.05 percent; and is extremely simple, employing in addition to the temperature probe, only two resistors. In the present invention, there are no moving elements connecting the probe to the balance of the computer and there are no moving elements in any part of the novel computer. The output of the probe, viz: a change in resistance, is continuous or smooth, and not piecewise as is the case with a mechanically driven potentiometer. These properties are exploited in the invention.

An object of the invention is to provide a computer circuit of the curve fitting analog approximation type to compute a function of a variable directly in accordance with a change in the resistance of a resistive element.

Another object of the invention is to provide an analog computer circuit to compute a function of a variable having a minimum of parts and especially no moving parts.

Another object of the invention is to provide an analog computer circuit to compute a function of a variable with greater accuracy than heretofore available.

Another object of the invention is to provide a more reliable means for computing a function of a variable as measured by a variable resistance probe.

Another object of the invention is to provide a computer having a minimum number of parts for computing the square root and logarithm of temperature as measured by a temperature resistance probe.

Another object of the invention is to accurately compute by analog means the square root and logarithm of temperature as measured by a temperature resistance probe.

Another object of the invention is to provide more reliable means for computing the square root and logarithm of temperature as measured by a temperature probe.

The invention contemplates apparatus for determining a predetermined mathematical function of a variable, employing an element which changes resistance in accordance with a change of the variable, connected in series with two fixed resistance elements. Excitation is applied at one point, and a detector is applied at a different point. The values of the two fixed resistance elements are such that the ratio of detected excitation to applied excitation is proportional to a predetermined mathematical function of the variable.

The foregoing and other objects and advantages of the invention will appear more fully hereinafter from a consideration of the detailed description which follows, taken together with the accompanying drawings wherein one embodiment of the invention is illustrated by way of example. It is to be expressly understood, however, that the drawings are for illustration purposes only and are not to be construed as defining the limits of the invention.

Figure 1:
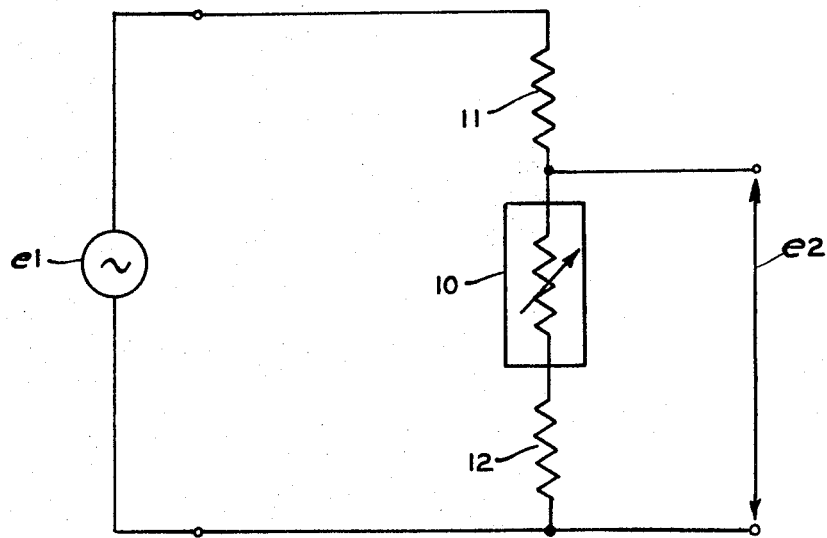
FIGURE 1 is a schematic view of a novel analog computer constructed according to the invention.

In the drawing of FIGURE 1 there is shown a novel analog computer comprising a probe 10, whose resistance changes with changes of a variable, connected in series with fixed resistors 11 and 12. An excitation voltage $e_1$ is applied across the probe 10 and the resistors 11 and 12, and an output voltage $e_2$ is measured across the probe 10 and resistor 12. The output voltage $e_2$ is proportional to a predetermined function of the variable being measured by probe 10. Thus, if the predetermined function is square root, and the variable measured by probe 10 is temperature (T$i$), the output voltage $e_2$ in mathematical symbols, equals:

Equation I $$e_2 = \frac{e_1 \sqrt{Ti}}{A}$$

where:

T$i$ is the temperature being measured, and
A is a constant.

The output voltage $e_2$ is made proportional to the square root of the temperature T$i$ by proper selection of the values R11 and R12 of resistors 11 and 12, respectively. These values are selected as follows:

Write the equation for the network, viz:

Equation II $$e_2 = e_1 \left( \frac{R10 + R12}{R10 + R11 + R12} \right)$$

The resistance R10 of temperature probe 10 should vary as a function of the temperature T$i$ which it is measuring. In one arrangement, the resistance of the temperature probe varies from 35 to 80 ohms with temperature changes from −70° C. to +160° C. according to the following equation:

Equation III $$R10 = 50 \left[ 1 + .003945 \left[ Ti - 1.493 \left( \frac{Ti}{100} - 1 \right) \frac{Ti}{100} \right] \right]$$

While a temperature probe which changes resistance with temperature in accordance with the above equation is found satisfactory, different temperature probes may require other variations of resistance with temperature.

Combining Equation I and Equation II:

Equation IV $$\frac{A(R10 + R12)}{R10 + R11 + R12} = \sqrt{Ti}$$

and using three values of R10 obtained from the above Equation III, three simultaneous equations in three unknowns can be set up. These simultaneous equations can then be solved for R11, R12, and A. R11 and R12 are the values of resistors 11 and 12, respectively, which will provide a ratio $e_2/e_1$ proportional to the square root of T$i$.

The curve fitting technique is well known and explained in greater detail in vol. 21 of the MIT Radiation Laboratory Series entitled Electronic Instruments, pp. 103–104.

As an example of evaluating R11, R12, and A for three given values of T$i$ there is determined from Equation III the value of R10,

| $\sqrt{Ti}$ | R10 |
|---|---|
| 20.0422 | 39.942 |
| 24.1182 | 59.911 |
| 27.5987 | 79.292 |

These three values of R10 and $\sqrt{Ti}$ are placed in Equation IV, which is solved for A R11, and R12, viz:

$$A = 82.912$$
$$R12 = 29.686$$
$$R11 = 218.414$$

In the present embodiment, temperature measurements of the square root of the temperature within an accuracy of .05 percent are obtained for a temperature range —70° C. to +160° C. which corresponds to a range of R10 varying from 35 to 80 ohms.

In addition to the square root of a variable, other functions of the variable are obtainable with the circuit of FIGURE 1. For example, the output voltage $e_2$ can be made proportional to the log of temperature T$i$ as measured by the probe 10, or in mathematical symbols Equation V $$e_2 = \frac{e_1 \log Ti}{A'}$$

where:

A' is a constant.

The appropriate values of resistance R11 and R12 for resistor 11 and 12 and the value of constant A' are selected as before. First, combine the Equation V with the network Equation II:

Equation VI $$\log Ti = \frac{A'(R10 + R12)}{R10 + R11 + R12}$$

and then solve three simultaneous equations VI with three different values of log T$i$ and R10 for A', R11 and R12.

For example, in a temperature range of —70° C. to +300° C. corresponding to the resistance of the probe varying from 30 ohms to 105 ohms, the three values of T$i$, log T$i$, and R10 are:

| T$i$, °K. | Log T$i$ | R10 |
|---|---|---|
| 313.16 | 2.36765 | 42.105 |
| 383.16 | 2.58338 | 71.145 |
| 523.16 | 2.72685 | 98.875 | from which A, R11, R12 are determined to be $$A' = .28162$$
$$R11 = 43.412$$
$$R12 = 44.768$$

As described, change in the resistance of the probe 10 is related to changes in temperature T$i$, however, the circuit may be used equally well to determine the square root, or log, or function of any variable and is not limited to temperature.

As described, the relation between change in resistance of probe 10 and change of the variable is substantially linear. However, the circuit may be used equally well with a non-linear probe. For example, a temperature probe having a logarithmic change in resistance for a linear change in temperature is placed in the novel circuit in which the values of resistors 11 and 12 are determined by Equation IV, the ratio $e_2/e_1$ is proportional to the square root of the logarithm of temperature $\sqrt{\log Ti}$.

Or, where the logarithmic probe is used in the circuit with resistors 11 and 12 having values as determined by Equation VI the ratio $e_2/e_1$ is proportional to the logarithm of the logarithm of temperature log-log T$i$. Both quantities $\sqrt{\log Ti}$ and log-log T$i$ are fundamental in an air data computer.

An essential of the invention is placing a resistive probe, viz: one whose resistance changes with a change in a variable, in the function approximation circuit. Some applications may require that the resistive element be located some distance away from the approximation circuit. For example, a temperature resistance probe may be placed in a wing tip of an aircraft and the approximation circuit in the fuselage. In these applications, any conventional or convenient arrangement may be used to cancel out the effects of the resistance of the conductors that connect the element in the circuit.

Figure 2:
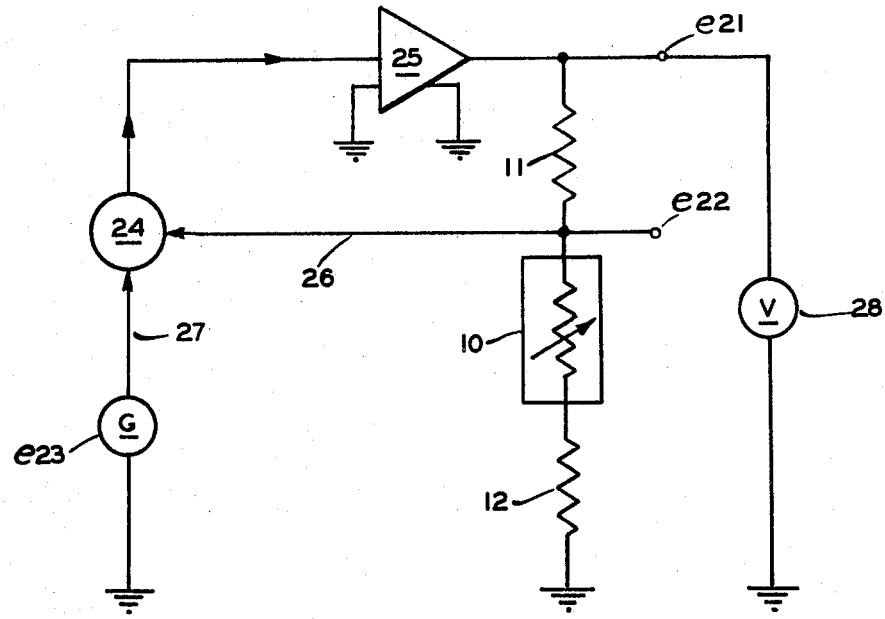
FIGURE 2 is a schematic view of an analog computer system incorporating the present invention.

The circuit of FIGURE 1 may be combined in a variety of systems to furnish mathematical relations involving the square root, log, or other function obtainable with the novel circuit. For example, to compute the value of $1/\log a_i$ where $a_i$ is acceleration (and where the resistance R10 of resistor 10 varies with changes in acceleration) the computer of FIGURE 1 is combined with an operational amplifier as shown in FIGURE 2.

As shown before, the ratio $e_{22}/e_{21}$ may be made proportional to log $a_i$ and Equation VII $$\left(\frac{e_{21}}{e_{22}} = \frac{1}{A'' \log a_i} = \frac{R10 + R11 + R12}{R10 + R12}\right)$$

where:

A'' is a constant.

A source of constant voltage excitation $e_{23}$ having an amplitude of 1 volt is fed by conductor 27 into a summer 24. The output of the summer feeds an operational amplifier 25, whose output $e_{21}$ is placed across the series combination of the approximation circuit. A conductor 26 connects the junction of resistance 11 and probe 10 (where the voltage with respect to ground is $e_{22}$) to the summer 24. The operational amplifier 25 is of a conventional or convenient type having phase or polarity reversal. Thus, the voltage $e_{22}$ is held at the same amplitude, but of an opposite sign, or polarity, as the voltage source $e_{23}$. As $e_{23}$ is of constant amplitude, $e_{22}$ is therefore held at a constant amplitude. The ratio $e_{21}/e_{22}$ is equal to $e_{21}$, because $e_{22}$ equals 1 volt; and $e_{21}$ as measured by a volt meter 28 at the output of the operational amplifier 25 is proportional to $1/\log a_i$.

In summary, the invention is an apparatus for determining a mathematical function of a variable where the variable is sensed by a probe which changes resistance in accordance with changes in the variable. The probe is connected in series with two fixed resistors, and the excitation is applied thereto, and detection means is applied at another point. A network equation is written for the ratio of detected excitation to applied excitation, this ratio is set proportional to the mathematical function which is to be determined. The defining relationship between changes in resistance of the probe and changes in the variable is added to this equation. Solution of the equation supplies the values of the two fixed resistors and a constant for proportionality. While the present disclosure shows an analytical method for determining the values of the two fixed resistors, graphical methods may also be used. An essential of the invention is that the probe is an integral part of the computer, and its output, viz: a smooth or continuous change in resistance for change in the variable, is applied directly in the computer which in turn computes the mathematical function without any moving parts.

Although but a single embodiment of the invention has been illustrated and described in detail, it is to be expressly understood that the invention is not limited thereto. Various changes may also be made in the design and arrangement of the parts without departing from the spirit and scope of the invention as the same will now be understood by those skilled in the art.

What is claimed is:

1. An apparatus for determining a mathematical function of a variable, comprising a probe which changes resistance in accordance with changes in the variable, a pair of fixed resistors connected in series with the probe, a source of excitation applied across the probe and resistors, and means for directly determining the magnitude of voltage across the probe and one of said fixed resistors, the resistances of the resistors and probe being determined in accordance with the equation $$f(v) = \frac{A(R10+R12)}{R10+R11+R12}$$

where:

A is a constant of proportionality,
R10 is the resistance of the probe, and
R11 and R12 are the resistances of the fixed resistors.

2. An analog computer to determine a function of a variable $f(v)$ expressed as an electrical voltage comprising a probe whose resistance R10 varies substantially linearly with changes of the variable $v$, two fixed resistors having resistances R11 and R12 serially connected with the probe, said resistors being determined in accordance with three simultaneous equations for three different values of the variable $v$, each equation having the form $$f(v) = \frac{A(R10+R12)}{R10+R11+R12}$$

where:

A is a constant of proportionality, a source of potential to apply a voltage across the series combination of resistances R10, R11, and R12, and means for detecting voltage across resistances R10 and R12, said voltages being equal in magnitude to the function of the variable multiplied by the voltage applied and divided by the constant of proportionality A.

3. An apparatus for determining the square root of temperature $\sqrt{Ti}$ as a voltage quantity comprising a probe whose resistance R10 varies in accordance with changes of temperature, two fixed resistors connected in series with the probe having resistances R11 and R12, said resistances R11 and R12 being determined in accordance with the equation $$\sqrt{Ti} = \frac{A(R10+R12)}{R10+R11+R12}$$

where:

A is a constant of proportionality, a source of voltage excitation applied across the series combination of resistances R10, R11, and R12, and means for detecting voltage across resistances R10 and R12, said detected voltage being equal in magnitude to the square root of temperature multiplied by the magnitude of the voltage applied and divided by the constant of proportionality A.

4. An apparatus for determining the logarithm of temperature log $Ti$ as a voltage quantity comprising a probe whose resistance R10 varies in accordance with changes of temperature, two fixed resistors connected in series with the probe having resistances R11 and R12, said resistances R11 and R12 being determined in accordance with the equation $$\log Ti = \frac{A(R10+R12)}{R10+R11+R12}$$

where:

A is a constant of proportionality, a source of voltage excitation applied across the series combination of resistances R10, R11, and R12, and means for directly detecting voltage across resistances R10 and R12, said detected voltage being equal in magnitude to the logarithm of temperature multiplied by the magnitude of the voltage applied and divided by the constant of proportionality A.

5. Apparatus for determining a function of a variable, comprising a first resistor changing resistance in accordance with changes in the variable, second and third fixed resistors connected in series with the first resistor, a source of voltage, an amplifier energized from the source of voltage and connected across the resistors, a feedback connection across one of the fixed resistors to the amplifier input, and means for detecting voltage across the resistors.

References Cited by the Examiner

UNITED STATES PATENTS

| | | | |
|---|---|---|---|
| 2,659,234 | 11/1953 | Harrison | 73—362 |
| 2,959,958 | 11/1960 | Savet | 235—194 X |
| 2,993,377 | 7/1961 | Dauphinee et al. | 235—193 X |

OTHER REFERENCES

General Electric Thermistor Manual No. TH–13A, Aug. 15, 1956, p. 11.

MALCOLM A. MORRISON, *Primary Examiner.*

WALTER W. BURNS, JR., *Examiner.*

C. L. WHITHAM, A. J. SARLI, *Assistant Examiners.*